UNITED STATES PATENT OFFICE.

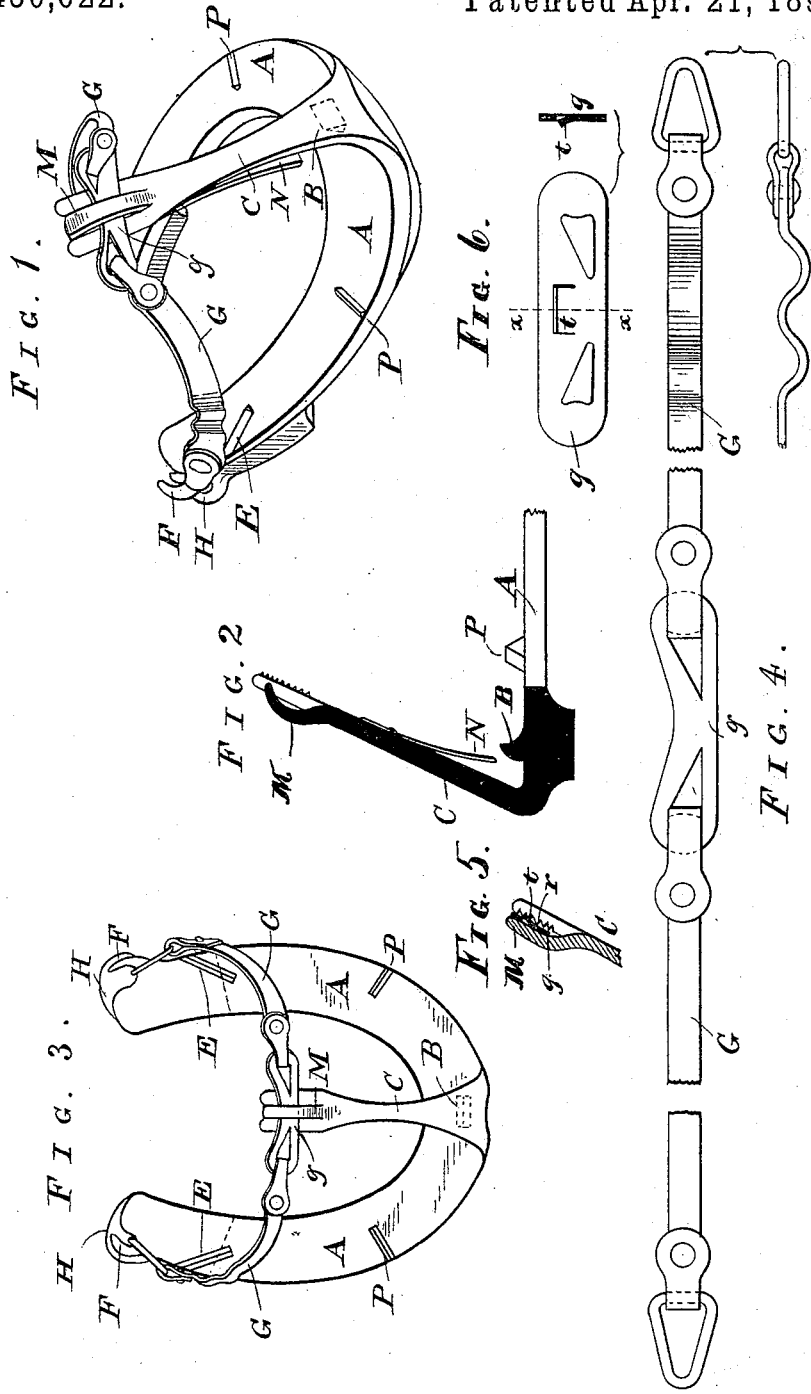
(No Model.)
C. J. JUTSON & F. A. POUPARD.
HORSESHOE.
No. 450,622. Patented Apr. 21, 1891.
Witnesses
Inventors
CHARLES JAMES JUTSON
FRED.K ABRAHAM POUPARD
By their Attorney

CHARLES JAMES JUTSON AND FREDERICK ABRAHAM POUPARD, OF LONDON, ENGLAND.

HORSESHOE.

SPECIFICATION forming part of Letters Patent No. 450,622, dated April 21, 1891.

Application filed August 13, 1889. Serial No. 320,632. (No model.)

*To all whom it may concern:*

Be it known that we, CHARLES JAMES JUTSON and FREDERICK ABRAHAM POUPARD, both residents of London, England, and subjects of the Queen of Great Britain and Ireland, have invented Improvements in Shoes for Horses or other Hoofed Animals, of which the following is a specification.

Our invention is additional to that set forth in our United States Letters Patent No. 393,835, dated December 4, 1888, and relates to a modified and improved nailless shoe for horses or other hoofed animals, which will firmly adhere to the hoof of the horse or other animal without nails or hurtful pressure upon the hoof.

Figure 1 is a perspective view of our improved horseshoe, as hereinafter described and claimed. Fig. 2 is a transverse section. Fig. 3 is a plan of the shoe. Fig. 4 is a view of the side bands and connecting-link. Figs. 5 and 6 are respectively a vertical section and a face view with appended cross-section at *x x*, illustrating an alternative detail.

Like letters refer to corresponding parts in the several figures.

We have in practice found it advisable, in order to more firmly lock the nailless shoe on the hoof and to prevent the shoe slackening by jar, to use studs or equivalent projecting prismatic ridges of the especial form and approximate situations, as hereinafter more fully described, raised by stamping out of the solid metal or otherwise upon the upper tread of the shoe recessed into the under face of the hoof and used in combination with a spring or springs at the inner base of the toe pillar or pillars or external clips. Of these tread-studs we place one B, projecting from the shoe A, close behind the toe pillar or pillars C, and the toe-stud has its forward face parallel to the inside face of the toe-pillar and terminating, preferably, in a sharp ridge-point, which slopes back to the body of the shoe. (Seen in the sectional view, Fig. 2.) Toward the heel of the shoe we also apply a prismatic ridge E, one on each side, and both placed with their faces diagonally to one another—*i. e.*, converging toward the front part of the shoe—so that if there is a backward thrust of the hoof upon these ridges or studs they will by their reaction tend to expand and not contract the rear of the hoof.

Where the hoof tends to scale or is tender, we use two studs P P on the flanks of the shoe, placed radially to the center of the shoe, so as to embed into the under side of the hoof in a direction traversing the layers or fibers of the hoof at right angles and serving to distribute the locking strain.

To aid economical construction, we make the back clip F, for the attachment of the bands G, to be stamped from the solid shoe, in form of a hook, and the end of the band, when attached to the said hook, may be protected by the ledge H, stamped out underneath the hook. We construct the band also in the following modified manner: The back attachment of the said band or bands G is effected by an eye of wire approximately triangular in shape, the band being riveted to the said eye. The front ends of the said band or bands G are connected together by an intermediate link *g*, the bearing-surface of the middle link being rounded so that the side bands always take their bearing on the center of their loops. The said toe-pillar C may be constructed with a fork at its upper extremity, formed by forcing out the central portion in part to produce a prong M, the band or bands being caused to pass between the said prong M and the face of the fork, which may be made in wedge shape, so that the band is tightened as it is passed down into place. When the bands are in place, the prong M is knocked over, so as to firmly secure the band, as shown in Figs. 1, 2, and 3. The back of the fork may be roughened at that part which lies upon the hoof, as in Fig. 2. The face or edges of the pillar may be serrated with undercut ratchet-teeth *r*, Fig. 5, into which the upper edge of the band or a tongue *t*, Figs. 5 and 6, therefrom may engage.

To give elasticity to the band or bands, we make corrugations in the band in one or more places, which will permit of elastic extension. (See Fig. 4.)

We provide a spring N at the interior base of the toe-pillar C to maintain a uniform backward pressure upon the hoof, even when the hoof does not actually fit upon the face of the said pillar.

Having now particularly described and ascertained the nature of our invention and in what manner the same is to be performed, we declare that what we claim is—

1. The shoe proper having hooks at its respective heel ends and a toe-pillar in front and constructed with tread-studs in the form of ridges upon the upper tread, one of which is placed transversely immediately behind the toe-pillar, one radially on each flank, and two diagonally near the heel ends, these last-named tread-studs converging to a point at the front of the shoe, in combination with side bands and connections interlocking with said hooks and with the upper end of said toe-pillar, substantially as and for the purposes described.

2. In a nailless horseshoe, the combination of a toe-pillar provided with a spring at its inner base, with a tread-stud placed immediately behind the said pillar to effect the locking of the shoe upon the hoof, substantially as described.

3. In a nailless horseshoe, a toe-pillar constructed with a bifurcated upper end and with a pliable central prong located in front of the fork and adapted to be upset rearwardly into the intertine space of the fork, in combination with a fastening-band crossing said fork behind said central prong, substantially as described.

4. In combination with a fastening-band having eyes at its rear ends, the shoe proper constructed with laterally-projecting hooks at its heel ends to engage with said eyes, and projecting ridges which project laterally below the respective hooks, substantially as described and shown.

5. In combination with a fastening-band and suitable connections, the shoe proper constructed with tread-studs in the form of ridges located on the top tread near the heel ends and converging toward the front part of the shoe, substantially as described and shown, for the purpose set forth.

In testimony whereof we have signed our names to this specification in the presence of two subscribing witnesses.

CHARLES JAMES JUTSON.
FREDERICK ABRAHAM POUPARD.

Witnesses:
W. J. TEMPLE,
ALBERT E. NASH.